United States Patent [19]

Nukiyama

[11] Patent Number: 4,807,172

[45] Date of Patent: Feb. 21, 1989

[54] VARIABLE SHIFT-COUNT BIDIRECTIONAL SHIFT CONTROL CIRCUIT

[75] Inventor: Tomoji Nukiyama, Tokyo, Japan

[73] Assignee: NEC Corporation, Tokyo, Japan

[21] Appl. No.: 15,466

[22] Filed: Feb. 17, 1987

[30] Foreign Application Priority Data

Feb. 18, 1986 [JP] Japan .................................. 61-34388

[51] Int. Cl.$^4$ ................................................ G06F 7/00
[52] U.S. Cl. ................................ 364/715.08; 364/748
[58] Field of Search .............................. 364/748, 715

[56] References Cited

U.S. PATENT DOCUMENTS

| 3,193,669 | 7/1965 | Voltin ................... | 364/748 |
| 4,366,548 | 12/1982 | Kregness et al. ............ | 364/748 |
| 4,562,553 | 12/1985 | Mattedi et al. ............ | 364/745 |
| 4,644,490 | 2/1987 | Kobayashi et al. ............ | 364/748 |
| 4,649,508 | 3/1987 | Kanuma ................... | 364/748 |

FOREIGN PATENT DOCUMENTS

| 0164451 | 12/1985 | European Pat. Off. ............ | 364/748 |
| 0177279 | 4/1986 | European Pat. Off. ............ | 364/748 |
| 59-60637 | 4/1984 | Japan ................... | 364/748 |
| 59-79495 | 5/1984 | Japan . | |

OTHER PUBLICATIONS

Smith et al., "Fix-Point, Floating-Point Adder", Technical Note No. 846, RCA, Aug. 20, 1969.
Earle et al., "Exponent Differences and Preshifter", IBM Tech. Disclosure Bulletin, vol. 9, No. 7, Dec. 1966, pp. 848-849.

Primary Examiner—Gary V. Harkcom
Assistant Examiner—Tan V. Mai
Attorney, Agent, or Firm—Sughrue, Mion, Zinn, Macpeak, and Seas

[57] ABSTRACT

A shift control circuit comprising an arithmetic circuit for producing a string of a predetermined number of data bits, a logic circuit for detecting the positive or negative sign of the bit string and producing a first switch signal responsive to the positive sign of the bit string or a second switch signal responsive to the negative sign of the bit string, a one's complement generator circuit for producing a signal representative of the one's complement of the bit string, a first selective signal transfer circuit such as a multiplexer which is transparent directly to the bit string in response to the first switch signal or to the signal from the one's complement generator circuit in response to the second switch signal, a decoder circuit for decoding the bit string or the signal passed through the first selective signal transfer circuit for producing a decoded output signal, a single-bit shifter circuit for shifting the bit of the decoded output signal by a single bit in a predetermined direction for producing a single-bit shifted output signal, and a second selective signal transfer circuit such as a multiplexer which is transparent directly to the decoded output signal in response to the first switch signal or to the signal from the single-bit shifter circuit in response to the second switch signal.

4 Claims, 4 Drawing Sheets

VARIABLE SHIFT-COUNT BIDIRECTIONAL SHIFT CONTROL CIRCUIT

FIELD OF THE INVENTION

The present invention relates in general to digital logic circuits and, particularly, to a circuit for controlling the shift operations for a sequence of bits in a digital logic circuit. More particularly, the present invention relates to a shift control circuit in which the digits stored in a computer register, accumulator or memory location are to be shifted by variable numbers of digits in assembly language programming with the register, accumulator or memory location.

BACKGROUND OF THE INVENTION

It is assumed that a bit string N including number of bits n is used as the data bits to indicate the shift count for a given sequence D of data bits, viz., the number of bit positions or digits by which the digits in the given data bit sequence D are to be shifted. As well known in the art, the shift counts available with such a data bit string N total to $2^{n}-1$ counts inclusive of a zero-bit shift since a $2^n$-bit shift is equivalent in effect to the zero-bit shift. The data bits of such a bit string N may be solely indicative of the shift count or may include not only the bits indicative of the shift count but also a bit indicating the direction in which shifts are to be made within the data bit sequence D. Where the bit string N is represented in the two's complement system, each of the possible numbers which can be expressed by the bit string N is given as:

$$N = -2^{n-1}m_n + \sum_{i=0}^{n-2} m_i \cdot 2^i \qquad \text{Eq. 1}$$

where $m_i$ represents the individual digits forming the bit string N.

From this Eq. 1 it will be seen that the numbers which the bit string N can express consist of a set of integers ranging from $-2^{n-1}$ to $+(2^{n-1})$ inclusive of zero. Where such a data bit string N includes a sign bit assigned to the direction of shift, there are available two different shift making techniques. One technique is to make left and right shifts each by number of n bit positions in a shifter circuit with left-shift and right-shift potentialities. The other is to make use of the rotating or carry-around function of, for example, a barrel shifter to effect an N-bit shift in one direction and a shift by a $2^{n-1}-N$ number of bit positions in the other direction, thus making virtual left and right shifts each by number n of bit positions. Of these two shift making techniques, the latter is generally preferred for ease of designing and constructing the shifter circuit to implement the particular technique.

On the other hand, in a dyadic operation in which two operands are to be arithmetically added together in a floating-point arithmetic routine, the digits of the mantissa of the operand with the lesser exponent part are shifted by a number of bit positions corresponding to the difference between the numbers of digits of the respective exponent values of the two operands. Thus, upon comparison between the respective exponent values of the two operands, a positive shift count can always be obtained by subtracting the smaller exponent value from the larger in the floating-point arithmetic routine. In the case of a high-speed floating-point arithmetic operation, sophisticated techniques are required for executing the comparison and subtraction by parallel processing for the scaling of the dyadic operands. Adoption of such parallel processing schemes inevitably results in a penalty of added hardware components of the register or accumulator using the high-speed floating-point arithmetic format.

The high-speed floating-point arithmetic routine has another problem in that, with the comparison and subtraction of the two exponent values performed in parallel, the subtracting operation proceeds without respect to the relationship in magnitude between the respective exponent values of the two operands. It may thus happen that the larger one of the exponent values is subtracted from the smaller although the direction of shift of the mantissa of the word number to be scaled is fixed. Assume furthermore that the smaller of two number words each of which is to result in a negative number represented by a two's complement is to be brought into a shifter circuit to effect an $|N|$-bit shift of the number word in the shifter circuit. If, in this instance, the $n^{th}$ bit $m_n$ of the bit string N equals 1, there holds the relationship $$|N| = \overline{N} + 1 \qquad \text{Eq. 2}$$

so that it is necessary to obtain from this Eq. 3 the absolute value of the two's complement of the number word brought into the shifter circuit. This means that a procedure similar to that used for making a shift by a $2^{n-1}-N$ number of bit positions in a barrel shifter as hereinbefore discussed is required to be followed using a rotation shifting technique, since $$\begin{aligned} 2^{n-1} - |N| &= 2^{n-1} - 2^{n-1} + 1 \\ &= \overline{N} + 1. \end{aligned} \qquad \text{Eq. 3}$$

Such a shifting procedure may be performed by a shifter circuit which has an $\overline{N}$-bit shift stage and a single-bit shift stage as taught in, for example, Japanese Provisional Patent Publication No. 59-0079495. As well known in the art, a number to be shifted is ordinarily longer in word length than a bit string to be used as the data predominant over the shift count. More hardware components are for this reason required for implementing the single-bit stage of the split-type shifter circuit. In addition, the circuit structure including the separate $\overline{N}$-bit and single-bit shift stages of such a shifter circuit is likely to result in prolonged and intricately routed signal transmission paths of the split-type shifter circuit. Implementation of such a circuit structure on a semiconductor integrated circuit chip therefore places significant limitations in the performance efficiency achievable of the circuit, especially where the circuit is used in a dynamic configuration.

It is accordingly an important object of the present invention to provide a useful solution to the problems which have thus far been inherent in the bidirectional shifting techniques with rotational features and the techniques for controlling the shift counts as required in effecting, for example, the scaling of dyadic operands in floating-point arithmetic routines as hereinbefore proposed and put into practice. It may be noted that the problems of the prior art shifting and scaling techniques include the limitations in the operating speeds available therefor, the requirement for additional hardware components and the resultant complexity of the shifter circuit. All these problems are encountered whether the operation $\overline{N}+1$ as above discussed is to be effected in an arithmetic circuit or in a shifter circuit which has separate $\overline{N}$-bit and single-bit shift stages.

SUMMARY OF THE INVENTION

In accordance with the present invention, there is provided a shift control circuit comprising (a) bit string generator means for producing a string of a predetermined number of data bits, (b) switching means for detecting the positive or negative sign of the bit string and producing a first switch signal responsive to the positive sign of the bit string or a second switch signal responsive to the negative sign of the bit string, (c) one's complement generator means for producing a signal representative of the one's complement of the bit string, (d) first selective signal transfer means responsive to the first and second switch signals for being transparent directly to the bit string in response to the first switch signal or to the signal from the one's complement generator means in response to the second switch signal, (e) decoder means for decoding the bit string or the signal passed through the first selective signal transfer means for producing a decoded output signal, (f) single-bit shifting means for shifting the bit of the decoded output signal by a single bit in a predetermined direction for producing a single-bit shifted output signal, and (g) second selective signal transfer means responsive to the first and second switch signals for being transparent directly to the decoded output signal in response to the first switch signal or to the signal from the single-bit shifting means in response to the second switch signal.

In accordance with another outstanding aspect of the present invention, there is provided a shift control circuit comprising (a) bit string generator means for producing a string of a predetermined number of data bits (b) switching means for detecting the positive or negative sign of the bit string and producing a first switch signal responsive to the positive sign of the bit string or a second switch signal responsive to the negative sign of the bit string, (c) first selective signal transfer means responsive to the first and second switch signals for being transparent to the bit string in response to the first switch signal in response to the second switch signal, (d) one's complement generator means responsive to the first and second switch signals for producing a signal representative of the one's complement of the bit string in response to the second switch signal, (e) decoder means for decoding the bit string or the signal passed through the first selective signal transfer means for producing a decoded output signal, (f) single-bit shifting means for shifting the bit of the decoded output signal by a single bit in a predetermined direction for producing a single-bit shifted output signal, and (g) second selective signal transfer means responsive to the first and second switch signals for being transparent directly to the decoded output signal in response to the first switch signal or to the signal from the single-bit shifting means in response to the second switch signal. In a shift control circuit thus constructed, the first selective transfer means may comprise a plurality of first signal transmission gate means respectively responsive to the individual bits of the bit string produced by the bit string generator means, each of the first signal transmission gate means having a control terminal responsive to the first and second switch signals from the switch means and being activated to pass the bit string therethrough in response to the first switch signal. Furthermore, the one's complement generator means may comprise a plurality of second signal transmission gate means respectively responsive to the individual bits of the bit string produced by the bit string generator means, and a plurality of inverter means respectively connected to the second signal transmission gate means and respectively operative to invert the individual bits of the bit string, each of the second signal transmission gate means having a control terminal responsive to the first and second switch signals from the switch means and being activated to pass therethrough the bits inverted by the inverters in response to the second switch signal.

BRIEF DESCRIPTION OF THE DRAWINGS

The features and advantages of a shift control circuit according to the present invention will be more clearly appreciated from the following description taken in conjunction with the accompanying drawings in which.

FURTHER DESCRIPTION OF THE PRIOR ART

Figure 1:
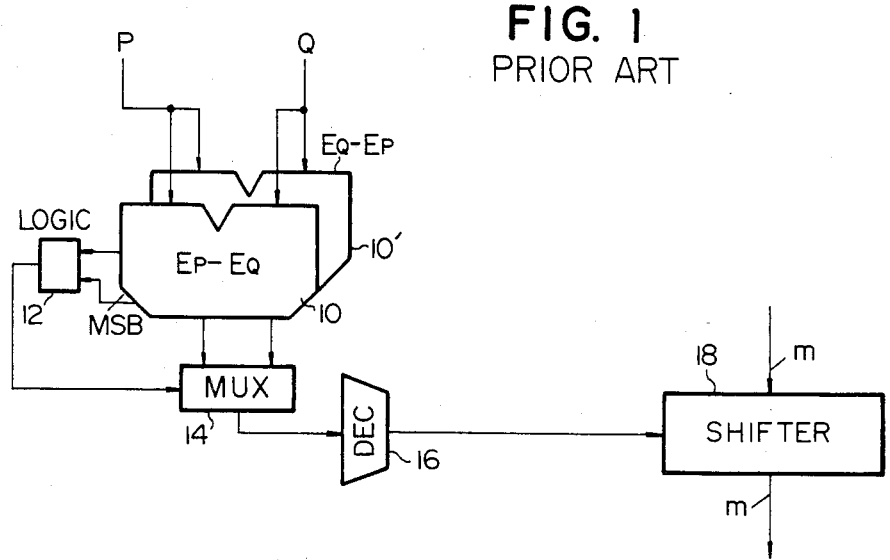
FIG. 1 is a block diagram showing part of a known shift control circuit of the type to which the present invention appertains.

A floating-point arithmetic routine is executed through a dyadic operation using two operands which may consist of a first number word P with an exponent part $E_P$ and a mantissa part $M_P$ and a second number part word Q with an exponent part $M_P$ and a mantissa part $M_Q$ as shown in FIG. 1.

A dyadic operation for such first and second number words P and Q in floating-point representation requires the scaling of the two number words as is customary in the art. For this purpose, comparison i first made between the respective exponent parts $E_P$ and $E_Q$ of the two number words P and Q, whereupon the smaller of the exponent parts is subtracted from the larger to scale up the number word with the smaller exponent part to the number word with the larger exponent part. Thus, if the exponent part $E_P$ of the first number word P is found to be larger than the exponent part $E_Q$ of the second number word Q upon comparison therebetween, the differential, denoted $S_v$, between the exponent parts is given as $$S_v = E_P - E_Q. \qquad \text{Eq. 4}$$

If the exponent part $E_P$ of the first number word P is found smaller than the exponent part $E_Q$ of the second number word Q, then the difference $S_v$ between the exponent parts is given as $$S_v = E_Q - E_P. \qquad \text{Eq. 4'}$$

It may be herein noted that the denotations $E_P$ and $E_Q$ in these equations represent the respective exponent values of the parts, not the values of the exponent parts per se.

The digits of the mantissa part of the number word with the smaller exponent part are then shifted toward the least significant bit (LSB) of the mantissa part by a number of bit positions equal to the differential $S_v$ to make a $S_v$-bit right shift. An arithmetic operation, viz., addition or subtraction as the case may be, is thereafter performed between the original digits of the mantissa part of the number word with the larger exponent part and the right shifted digits of the mantissa part of the number word with the smaller exponent part. The result of the arithmetic operation is then combined with the exponent part of the number word with the larger exponent part to produce a desired floating-point number word representative of the sum of or the difference between the given number words P and Q. All these procedures provide an ordinary, prototype nonnormalizing floating-point arithmetic routine not involving the subroutines to cope with exceptional events such as overflows of digits and the subroutine for the normalization of operands in integer form.

Where high-speed processing is one of the major requirements for the floating-point arithmetic operation, the addition or subtraction of the mantissa parts of the two operands or number words may be performed in a modified fashion depending upon the result of comparison between the respective exponent parts of the number words. In case, on the other hand, the result of the arithmetic operation is given by a negative number, then the absolute magnitude of the number may be calculated by an arithmetic operation in the two's complement system. This procedure is however objectionable for high-speed processing purposes. One of the conventional approaches to avoiding such a procedure is to perform the two subtractive operations $E_P - E_Q$ and $E_Q - E_P$ with use of two binary subtracters 10 and 10', respectively, as shown in FIG. 1. Of the respective results of the two arithmetic operations thus performed by the subtracters 10 and 10', the positive number resulting from one of the operations is selected by a logic circuit 12 and is passed through a multiplexer 14 to a decoder circuit 16 selectively either from one subtracter 10 or from the other subtracter 10'. The decoded output from the decoder circuit 16 is supplied to the control terminal of a shifter circuit 18 which is supplied with the mantissa part of one of the two number words to be processed for shifting of the digits. Another known approach is to compensate for the shifted version of the mantissa part of an original operand as in a shifter circuit taught in the named Japanese Provisional Patent Publication No. 59-0079495. As noted previously, limitations in the operating speeds achievable, the requirement for additional hardware components and the resultant complexity of the shifter circuit used.

DESCRIPTION OF THE PREFERRED EMBODIMENTS

Figure 2:
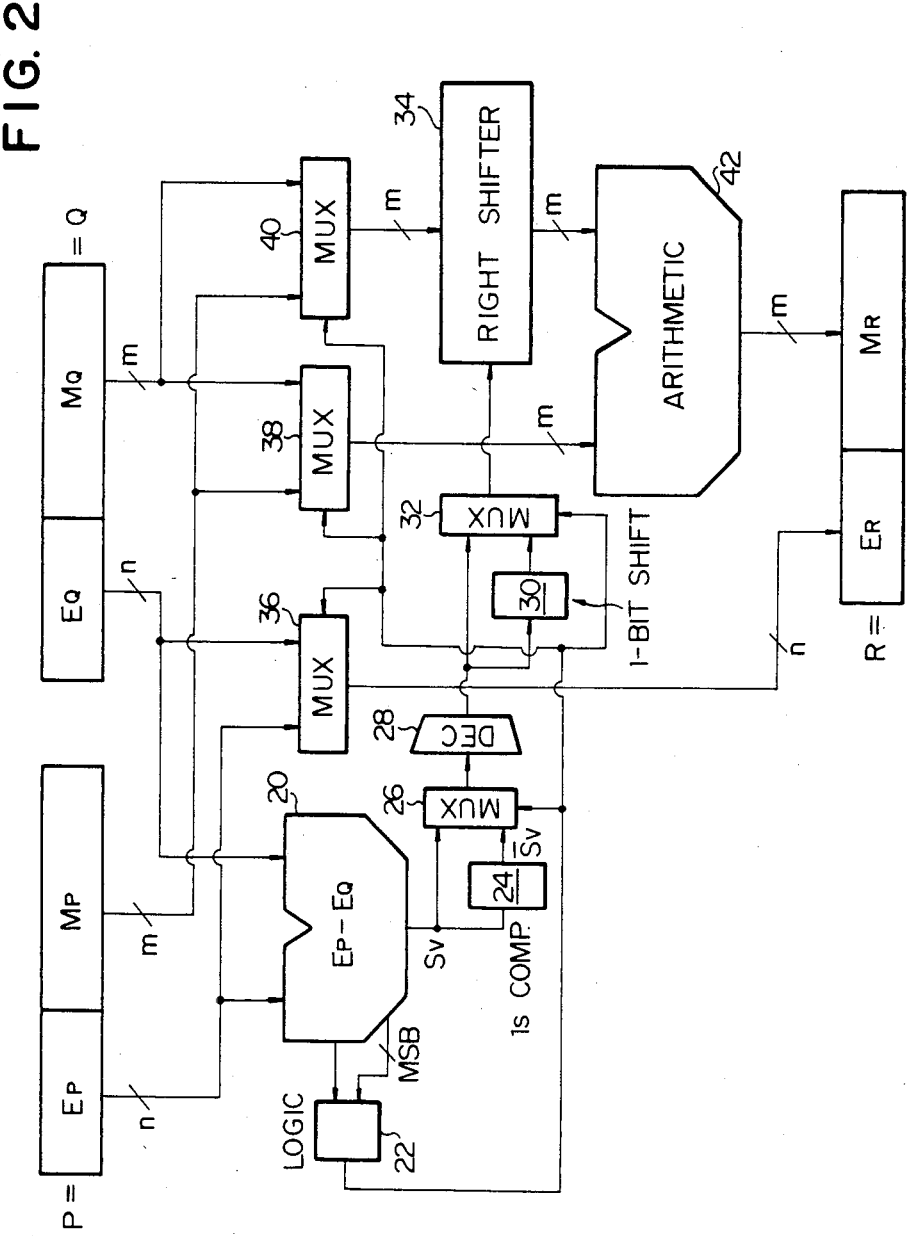
FIG. 2 is a block diagram showing the circuit arrangement of a floating-point arithmetic system incorporating a preferred embodiment of a shift control circuit according to the present invention.

FIG. 2 of the drawings shows a floating-point arithmetic system including a preferred embodiment of a shift control circuit adapted to realize such basic schemes in accordance with the present invention. In the shown floating-point arithmetic system, it is assumed by way of example that a floating-point arithmetic routine is executed for two dyadic m+n-bit operands. These m+n-bit operands consist of a first number word P with an n-bit exponent part $E_P$ and an m-bit mantissa part $M_P$ and a second number word Q with an n-bit exponent part $M_P$ and an m-bit mantissa part $M_Q$. In the description to follow, the exponent parts $E_P$ and $E_Q$, each expressed in binary form, are assumed to represent the respective exponent values of the parts, viz., the powers to which the bases (assumed to be binary) are raised, not the - values of the exponent parts per se.

Signals are thus produced which are representative of the respective exponent parts $E_P$ and $E_Q$ of these two number words P and Q. These signals are input to a first subtracter circuit 20 which subtracts the exponent part $E_Q$ of the second number word Q from the exponent part $E_P$ of the first number word P as shown. The subtracter circuit 20 thus outputs a signal indicative of the result, $S_v$, of the arithmetic subtraction. The output signal from the subtracter circuit 20 is input to and monitored by a logic circuit 22 which determines whether the result of a reversed subtraction $E_Q - E_P$ is in demand or not. If it is detected by the logic circuit 22 that the result of such a reversed arithmetic operation is in demand with the exponent part $E_Q$ larger than the exponent part $E_P$, the output signal from the first subtracter circuit 20 is further input to a one's complement generator circuit 24 which is operative to generate a signal representative of the one's complement $S_v$ of the supplied information. The signal thus produced by the one's complement generator circuit 24 is supplied through a first multiplexer 26 to a decoder circuit 28, which produces a decoded control signal to be predominant over the shift count required with the one's complement $S_v$ generated by the circuit 24. The control signal output from the decoder circuit 28 is transmitted to a single-bit shift circuit 30 for being shifted by one bit position in the incremental direction. The resultant control signal is passed through a second multiplexer 32 to the control terminal of a right shifter circuit 34. The control signal thus supplied from the second multiplexer 32 to the right shifter circuit 34 is finally indicative of the shift count by which the digits of the bit sequence to be input to the shifter circuit 34 are to be shifted right. Such a signal being equivalent to a value $S_v + 1$, the right shifter circuit 34 herein incorporated need not be organized in sophisticated shifter configuration such as the barrel type or literal type configuration.

The first multiplexer 26 has two input terminals, one connected to the subtracter circuit 20 and the other connected to the one's complement generator circuit 24, and a control terminal connected to the logic circuit 22. Under conditions in which the result $S_v$ of the reversed arithmetic operation $E_Q - E_P$ is detected to be in demand by the logic circuit 22, the logic circuit 22 accesses the control terminal of the first multiplexer 26 and makes the multiplexer 26 non-transparent to the signal directly received from the subtracter circuit 20 and transparent to the signal from the one's complement generator circuit 24. The second multiplexer 32 also has two input terminals, one connected to the decoder circuit 20 and the other connected to the single-bit shift circuit 30, and a control terminal connected to the logic circuit 22. Under conditions in which the result $S_v$ of the reversed arithmetic operation $E_Q - E_P$ is detected to be in demand by the logic circuit 22, the logic circuit 22 accesses the control terminal of the second multiplexer 32 and makes the multiplexer 32 non-transparent to the signal directly received from the decoder circuit 28 and transparent to the signal from the single-bit shift circuit 30. The logic circuit 22 further accesses the control terminal of the second multiplexer 32 and makes the multiplexer 32 non-transparent to the signal directly received from the decoder circuit 28 and transparent to the signal from the single-bit shift circuit 30. Thus, each of the first and second multiplexers 26 and 32 provides selective signal transfer means in a shift control circuit according to the present invention. The logic circuit 22 to steer such selective signal transfer means provides switching means for determining whether the output signal from the subtracter circuit 20 is in demand or not or whether the exponent part of one of the given dyadic operands is lesser or larger than the exponent part of the other and switching each of the multiplexers 26 and 32 to provide connection between its output terminal and one of its two input terminals. The output signal produced by this logic circuit 22 is thus indicative of the direction in which a shift is to be made for a given bit sequence by a shift count dictated by the output signal from the subtracter circuit 20.

When, on the other hand, the exponent part $E_P$ of the first number word P is larger than the exponent part $E_Q$ of the second number word Q, the logic circuit 22 determines that the result $S_v$ of the arithmetic operation $E_P - E_Q$ as performed by the subtracter circuit 20 is in demand. Thus, the logic circuit 22 makes the multiplexer 26 transparent to the signal from the subtracter circuit 20 and non-transparent to the signal from the one's complement generator circuit 24. The logic circuit 22 further makes the multiplexer 32 transparent to the signal from the decoder circuit 28 and non-transparent to the signal from the single-bit shift circuit 30. The signal indicative of the result $S_v$ of the arithmetic operation as output from the first subtracter circuit 20 now bypasses the one's complement generator circuit 24 and is transferred by way of the first multiplexer 26 to to the decoder circuit 28. The decoded control signal output from the decoder circuit 28 is indicative of the shift count for the bit sequence to be input to the right shifter circuit 34. The control signal thus bypasses the single-bit shift circuit 30 and is transmitted through the second multiplexer 32 to the control terminal of the right shifter circuit 34.

The shift control circuit embodying the present further comprises third, fourth and fifth multiplexers 36, 38 and 40 which are all directly responsive to the signals representative of the respective exponent parts $E_P$ and $E_Q$ of these two number words P and Q. Signals each of an m-bit length are thus also produced which are representative of the respective mantissa parts $M_P$ and $M_Q$ of the number words P and Q.

The third multiplexer 36 has two input terminals, one responsive to the signal indicative of the exponent part $E_P$ of the first number word P and the other responsive to the signal indicative of the exponent part $E_Q$ of the second number word Q, and a control terminal connected to the logic circuit 22. Under conditions in which the result $S_v$ of the arithmetic operation $E_P - E_Q$ is detected to be in demand by the logic circuit 22, the logic circuit 22 accesses the control terminal of the third multiplexer 36 and makes the multiplexer 36 transparent to the signal indicative of the exponent part $E_P$ of the first number word P and non-transparent to the signal indicative of the exponent part $E_Q$ of the second number word Q. When the result $S_v$ of the reversed arithmetic operation $E_Q - E_P$ is detected to be in demand, the logic circuit 22 makes the third multiplexer 36 non-transparent to the signal indicative of the exponent part $E_P$ of the first number word P and transparent to the signal indicative of the exponent part $E_Q$ of the second number word Q.

The fourth multiplexer 38 also has two input terminals, one responsive to the signal indicative of the mantissa part $M_P$ of the first number word P and the other responsive to the signal indicative of the mantissa part $M_Q$ of the second number word Q, and a control terminal connected to the logic circuit 22. Under conditions in which the result $S_v$ of the arithmetic operation $E_P - E_Q$ is detected to be in demand, the logic circuit 22 accesses the control terminal of the fourth multiplexer 38 and makes the multiplexer 38 transparent to the signal indicative of the mantissa part $M_P$ of the first number word P and non-transparent to the signal indicative of the mantissa part $M_Q$ of the second number word Q. When the result $S_v$ of the reversed arithmetic operation $E_Q - E_P$ is detected to be in demand, the logic circuit 22 makes the fourth multiplexer 38 non-transparent to the signal indicative of the mantissa part $M_P$ of the first number word P and transparent to the signal indicative of the mantissa part $M_Q$ of the second number word Q.

The fifth multiplexer 40 also has two input terminals, one responsive to the signal indicative of the mantissa part $M_P$ of the first number word P and the other responsive to the signal indicative of the mantissa part $M_Q$ of the second number word Q, and a control terminal connected to the logic circuit 22. When the result $S_v$ of the arithmetic operation $E_P - E_Q$ is detected to be in demand, the logic circuit 22 accesses the control terminal of the fifth multiplexer 40 and makes the multiplexer 40 non-transparent to the signal indicative of the mantissa part $M_P$ of the first number word P and transparent to the signal indicative of the mantissa part $M_Q$ of the second number word Q. When the result $S_v$ of the reversed arithmetic operation $E_Q - E_P$ is detected to be in demand, the logic circuit 22 makes the fourth multiplexer 38 transparent to the signal indicative of the mantissa part $M_P$ of the first number word P and non-transparent to the signal indicative of the mantissa part $M_Q$ of the second number word Q. Thus, each of the third, fourth and fifth multiplexers 36, 38 and 40 also provides selective signal transfer means in the floating-point arithmetic system.

Thus, when the result $S_v$ of the arithmetic operation $E_P - E_Q$ is detected to be in demand, the n-bit signal indicative of the exponent part $E_P$ of the first number word P is passed through the third multiplexer 36 and is output as representative of the exponent part $E_R$ of an output number word R. On the other hand, the m-bit signal representative of the mantissa part $M_P$ of the first number word P is passed by way of the fourth multiplexer 38 to one input terminal of a dyadic arithmetic circuit 42 while the m-bit signal representative of the mantissa part $M_Q$ of the second number word Q is passed by way of the fifth multiplexer 40 to an input terminal of the right shifter circuit 34. The right shifter circuit 34 is initiated to make a shift of the digits thereof with a bit count represented by the control signal which is present at its control terminal. The m-bit signal thus produced by the right shifter 34 and representative of a shifted version of the original mantissa part $M_Q$ of the second number word Q is supplied to the other input terminal of the dyadic arithmetic circuit 42. The arithmetic circuit 42 is now enabled to perform an arithmetic addition or subtraction between the two input operands which consists of the signal representative of the original mantissa part $M_P$ of the first number word P and the signal representative of the shifted version of the original mantissa part $M_Q$ of the second number word Q. The resultant m-bit signal is output from the arithmetic circuit 42 as representative of the mantissa part $M_R$ of the output number word R.

When the result $S_v$ of the reversed arithmetic operation $E_Q - E_P$ is detected to be in demand, the n-bit signal indicative of the exponent part $E_Q$ of the second number word Q is passed through the third multiplexer 36 and is output as representative of the exponent part $E_R$ of an output number word R. On the other hand, the m-bit signal representative of the mantissa part $M_Q$ of the second number word Q is passed by way of the fourth multiplexer 38 to one input terminal of the dyadic arithmetic circuit 42 while the m-bit signal representative of the mantissa part $M_P$ of the first number word P is passed by way of the fifth multiplexer 40 to the input terminal of the right shifter circuit 34. The right shifter circuit 34 is initiated to make a shift of the digits thereof with a bit count represented by the control signal present at its control terminal. The m-bit signal thus produced by the right shifter 34 and representative of a shifted version of the original mantissa part $M_P$ of the first number word P is supplied to the other input terminal of the dyadic arithmetic circuit 42. The arithmetic circuit 42 is enabled to perform an arithmetic addition or subtraction between the two input operands which consists of the signal representative of the original mantissa part $M_Q$ of the second number word Q and the signal representative of the shifted version of the original mantissa part $M_P$ of the first number word P. The resultant m-bit signal is also output from the arithmetic circuit 42 as representative of the mantissa part $M_R$ of the output number word R.

It will have been understood from the foregoing description that, in the floating-point arithmetic system hereinbefore described, the shift control circuit embodying the present invention is implemented specifically by the switching means provided by the logic circuit 22, one's complement generator circuit 24, selective signal transfer means provided by the first and second multiplexers 26 and 32, decoder circuit 28, and single-bit shift circuit 30.

Figure 3:
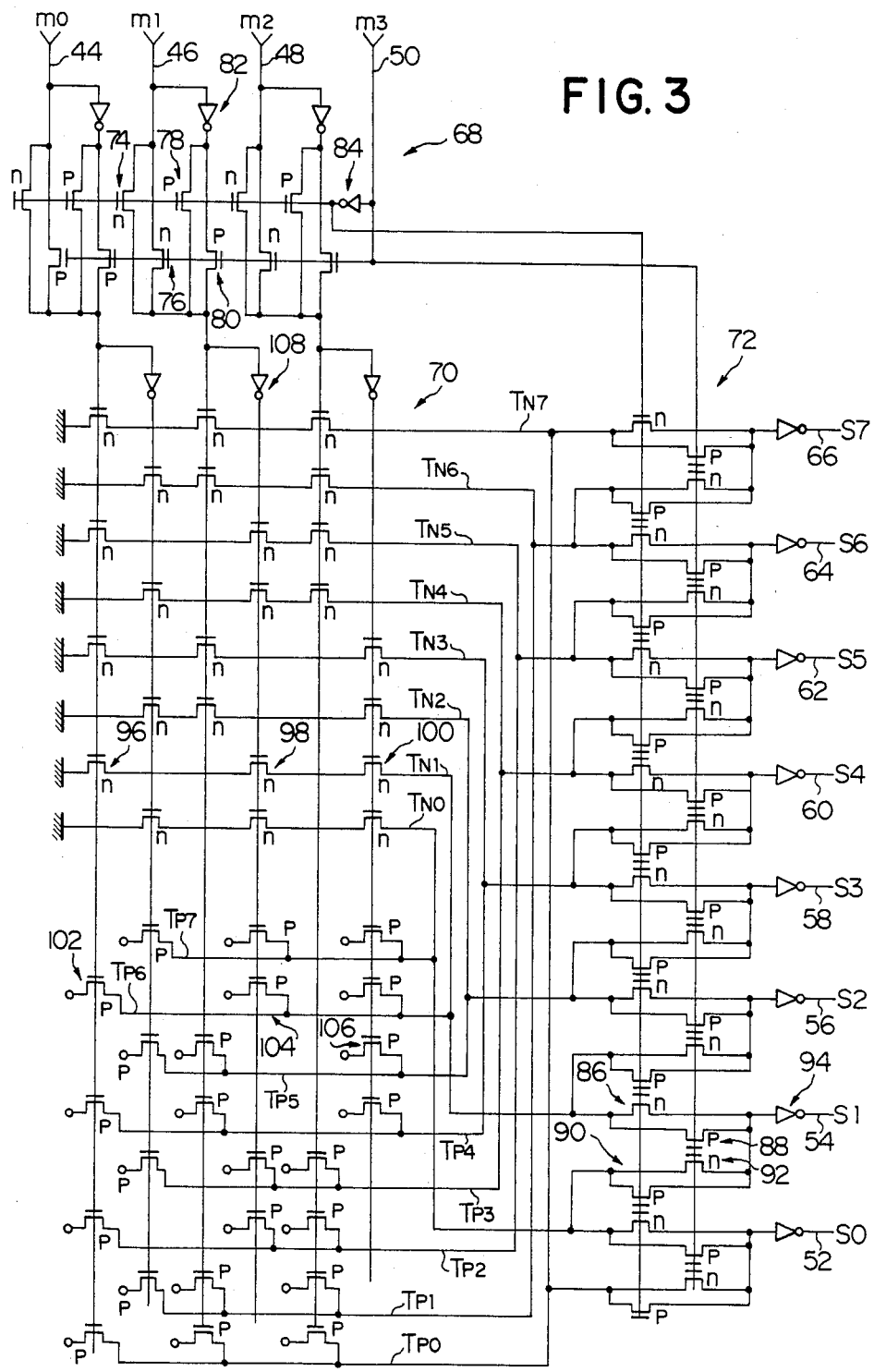
FIG. 3 is a circuit diagram showing another preferred embodiment of a shift control circuit according to the present invention.

FIG. 3 of the drawings shows another preferred embodiment of a shift control circuit according to the present invention. The embodiment herein shown is implemented by a complementary metal-oxide semiconductor (CMOS) circuit which is operative as a bidirectional shift control circuit for performing both right-shift and left-shift operations in a single, unidirectional shifter circuit. The shift control circuit herein shown is assumed to be responsive to a four-bit input signal which consists of a bit string of first, second and third shift-count control bits $m_0$, $m_1$ and $m_2$ and a single shift-direction control bit $m_3$, all of which are given in positive logic. The shift-count control bits $m_0$, $m_1$ and $m_2$ are predominant over the number of the shift positions by which a shift is to be made for a given bit sequence, while the shift-direction control bit $m_3$ is predominant over the direction on which the shift is to be made. By way of example, it is herein assumed that the fourth bit $m_3$ of logic "1" state is representative of a left or "toward-MSB" shift and that of logic "0" state is representative of a right or "toward-LSB" shift.

The shift-count control bits $m_0$, $m_1$ and $m_2$ may be supplied from a subtracter circuit which subtracts the exponent part of one given number word from the exponent part of another given number word as is the case with the subtracter circuit 20 in the system described with reference to FIG. 2. The input signal consisting of such shift-count control bits $m_0$, $m_1$ and $m_2$ is thus indicative of and is assumed to represent the result, $S_v$, of the arithmetic subtraction performed by the subtracter circuit 20. On the other hand, the shift direction control bit $m_3$ may be supplied from switching means indicative of the direction in which a shift is to be made for a given bit sequence by a shift count dictated by the output signal from the subtracter circuit 20. The control bit $m_3$ may thus be supplied from the logic circuit 22 in the system described with reference to FIG. 2.

The shift control circuit shown in FIG. 3 further has an 8-bit output signal consisting of bits $S_0$ to $S_7$ which are representative of a total of 256 different shift counts which are also given in positive logic. Thus, the control circuit has first to fourth input terminals 44 to 50 respectively assigned to the four bits $m_0$ to $m_3$ of the input signal and first to eighth output terminals 52 to 66 respectively assigned to the eight bits $S_0$ to $S_7$ of the output signal.

The control circuit per se largely consists of an shift count control section 68, an intermediate decoder section 70 and an output section 72, each of the sections being of the CMOS configuration.

The shift count control section 68 in turn consists of first, second and third subsections respectively responsive to the first, second and third shift-count control bits $m_0$, $m_1$ and $m_2$ through the input terminals 44, 46 and 48. These three subsections are all constructed similarly, each comprising a first transmission gate consisting of a parallel combination of n-channel and p-channel field-effect transistors 74 and 76 and a second transmission gate consisting of a parallel combination of p-channel and n-channel field-effect transistors 78 and 80 as illustrated particularly for the second subsection. The first transmission gate composed of the transistors 74 and 76 is directly connected at its input end to the second input terminal 46 and the second transmission gate composed of the transistors 78 and 80 is connected at its input end to the second input terminal 46 through an inverter 82. The two combinations of the field-effect transistors are connected at their output ends to the decoder section 70. The n-channel field-effect transistor 74 and p-channel field-effect transistor 78 have their gates connected through an inverter 84 to the fourth input terminal 50, while the p-channel field-effect transistor 76 and n-channel field-effect transistor 80 have their gates connected directly to the fourth input terminal 50.

In the presence of a logic "0" signal at the fourth input terminal 50 as the shift-direction control bit $m_3$, the first transmission gate composed of the n-channel and p-channel field-effect transistors 74 and 76 are turned on and the second transmission gate composed of the p-channel and n-channel field-effect transistors 78 and 80 are turned off. The logic "1" or "0" shift-count control bit $m_1$ at the second input terminal 52 is thus passed through the transistors 74 and 76 to the decoder section 70. In the presence, on the other hand, of a logic "1" signal at the fourth input terminal 50 as the shift-direction control bit $m_3$, the first transmission gate composed of the n-channel and p-channel field-effect transistors 74 and 76 are turned off and the second transmission gate composed of p-channel and n-channel field-effect transistors 78 and 80 are turned on. The logic "1" or "0" shift-count control bit $m_1$ at the second input terminal 52 is thus inverted by the inverter 82, the resultant logic "0" or "1" signal bit being supplied through the transistors 78 and 80 to the decoder section 70. Each of the first and third subsections of the shift count control section 68 is operative similarly to the second subsection, passing the logic "1" or "0" shift-count control bit $m_0$ or $m_2$ or an inverted versions of the bit to the decoder section 72 depending on the logic state of the shift-direction control bit $m_3$ at the fourth input terminal 56. It may be noted that the first and second transmission gates of each of the three subsections of the section 72 thus arranged are mutually exclusive with respect to the shift-count control bit supplied to the subsection.

The single-bit shifter section 72 consists of first to eighth subsections respectively connected to the output terminals 52 to 66. These eight subsections are also all constructed similarly, each comprising a first transmission gate consisting of a parallel combination of n-channel and p-channel field-effect transistors 86 and 88 and a second transmission gate consisting of a parallel combination of p-channel and n-channel field-effect transistors 90 and 92 as illustrated particularly for the second subsection. The first and second transmission gates composed of the transistors 86 and 88 and transistors 90 and 92, respectively, are connected in parallel between the second output terminal 54 through an inverter 94 and the decoder section 70. The n-channel field-effect transistor 86 and p-channel field-effect transistor 90 have their gates connected through the above mentioned inverter 84 to the fourth input terminal 50, while the p-channel field-effect transistor 88 and n-channel field-effect transistor 92 have their gates connected directly to the fourth input terminal 50.

In the presence of a logic "0" signal at the fourth input terminal 50 as the shift-direction control bit $m_3$, the first transmission gate composed of the n-channel and p-channel field-effect transistors 86 and 88 are turned on and the second transmission gate composed of the p-channel and n-channel field-effect transistors 90 and 92 are turned off. A logic "1" or "0" signal bit which may be supplied from the decoder section 70 to the second subsection of the single-bit shifter section 72 is thus passed through the transistors 86 and 88 to the second output terminal 54. In the presence, on the other hand, of a logic "1" signal at the fourth input terminal 50 as the shift-direction control bit $m_3$, the first transmission gate composed of the n-channel and p-channel field-effect transistors 86 and 88 are turned off and the second transmission gate composed of the p-channel and n-channel field-effect transistors 90 and 92 are turned on. The logic "1" or "0" signal bit received from the decoder section 70 is thus passed through the transistors 90 and 92 and is inverted by the inverter 94, the resultant logic "0" or "1" signal bit being supplied to the second output terminal 54. Each of the other subsections of the single-bit shifter section 72 is operative similarly to the second subsection of the section 72. An inverted version of a logic "1" or "0" signal bit which each of these subsections may receive from the decoder section 70 is thus passed to the associated one of the output terminals 52 to 66 either through the first transmission gate or through the second transmission gate composed of the transistors of the subsection depending on the logic state of the shift-direction control bit $m_3$ at the fourth input terminal 56. The first and second transmission gates of each of the subsections of the single-bit shifter section 72 are thus also mutually exclusive with respect to the signal bits which are to be supplied from the decoder section 70.

On the other hand, the decoder section 70 of the control circuit shown in FIG. 3 comprises a total of sixteen series combinations of field-effect transistors. These sixteen series combinations of the field-effect transistors consist of eight series combinations $T_{p0}$ to $T_{p7}$ of n-channel field-effect transistors and eight series combinations $T_{p0}$ to $T_{p7}$ of p-channel field-effect transistors, each of the combinations in turn consisting of three field-effect transistors. Each series combination of the n-channel field-effect transistors is connected to a logic "0" voltage supply source such as a ground line and each series combination of the p-channel field-effect transistors is connected to a logic "1" voltage supply source such as source of a positive supply voltage. One of the eight series combinations $T_{n0}$ to $T_{n7}$ of the n-channel field-effect transistors and one of the eight series combinations $T_{p0}$ to $T_{p7}$ of the p-channel field-effect transistors are connected in parallel to the first transmission gate of one of the subsections and the second transmission gate of another subsection of the single-bit shifter section 72. For example, the first transmission gate of the second subsection and the second transmission gate of the third subsection of the section 72 are connected in parallel to the second series combination $T_{n1}$ of three n-channel field-effect transistors 96, 98 and 100 and the seventh series combination $T_{p6}$ of three p-channel field-effect transistors 102, 104 and 106 as shown. Of the sixteen series combinations of the field-effect transistors, in addition, one (shown as the uppermost one) of the series combination of the n-channel field-effect transistors and one (shown as the lowermost one) of the series combinations of the p-channel field-effect transistors are shared by, viz., commonly connected to the second transmission gate of the subsection associated with the LSB bit $S_0$ and the first transmission gate of the subsection associated with the MSB bit $S_7$ of the output signal, as shown. This is important to provide a rotate function of the shift control circuit under consideration.

The three n-channel field-effect transistors 96, 98 and 00 and the three p-channel field-effect transistors 102, 104 and 106 associated with the second subsection of the section 72 have their gates connected selectively to the output ends of the first, second and third subsections of the shift count control section 68. More specifically, the n-channel and p-channel field-effect transistors 96 and 102 have their gates commonly connected to the output end of the first subsection of the shift count control section 68, and the n-channel and p-channel field-effect transistors 98 and 104 have their gates commonly connected to the output end of the second subsection of the section 68 through an inverter 108. The n-channel and p-channel field-effect transistors 100 and 106 have their gates commonly connected to the output end of the third subsection of the section 68 also through an inverter as shown. In like manners, one of the n-channel field-effect transistors and one of the p-channel field-effect transistors associated with each of the other subsections of the single-bit shifter section 72 have their gates commonly connected to the output end of one of the three subsection of the section 68 either directly or through an inverter such as the inverter associated with the second subsection.

In the shift control circuit constructed and arranged as hereinbefore described, the signal bits to appear at the gates of the transistors of each of the series combinations $T_{n0}$ to $T_{n7}$ of the n-channel field-effect transistors are complementary to the signal bits to appear at the gates of the transistors of the like-numbered series combination of the n-channel field-effect transistors. Thus, when the shift-count control bits $m_0$, $m_1$ and $m_2$ transmitted through the shift count control section 68 without being inverted are present, without being inverted, at the gates of the transistors of, for example, the eighth series combination $T_{n7}$ of the n-channel field-effect transistors, there appear complementary signal bits $\overline{m}_0$, $\overline{m}_1$ and $\overline{m}_2$ at the gates of the transistors of the eighth series combination $T_{p7}$ of the p-channel field-effect transistors. In the presence, on the other hand, of signal bits $m_0$, $\overline{m}_1$ and $\overline{m}_2$ at the gates of the transistors of the second series combination $T_{n2}$ of the n-channel field-effect transistors, there appear complementary signal bits $\overline{m}_0$, $m_1$ and $m_2$ at the gates of the transistors of the second series combination $T_{p1}$ of the p-channel field-effect transistors. When the logic state of the shift-direction control bit $m_3$ is then logically inverted, the signal bits at the gates of the transistors of the second series combination $T_{n2}$ of the n-channel field-effect transistors are substituted by signal bits $\overline{m}_0$, $\overline{\overline{m}}_1$ and $\overline{m}_2$ and the signal bits at the gates of the transistors of the second series combination $T_{p2}$ of the p-channel field-effect transistors are substituted by signal bits $\overline{\overline{m}}_0 (=m_0)$, $\overline{m}_1$ and $\overline{\overline{m}}_2 (=m_2)$.

Thus, the series combinations $T_{n0}$ to $T_{n7}$ of the n-channel field-effect transistors are to be activated in exclusive relationship to the series combinations $T_{p0}$ to $T_{p7}$ of the p-channel field-effect transistors. Whether the series combinations $T_{n0}$ to $T_{n7}$ of the n-channel field-effect transistors are to be activated or the series combinations $T_{p0}$ to $T_{p7}$ of the p-channel field-effect transistors are to be activated depend on the logic states of the input bits $m_0$, $m_1$, $m_2$ and $m_3$, particularly on the shift-direction control bit $m_3$, viz., depending on the direction in which a shift is to be made.

In the presence, now, of the shift-direction control bit $m_3$ of logic "0" state, the first transmission gates of all the subsections of the single-bit shift section 72 are activated with the second transmission gates of the section 72 held inoperative. Under these conditions, either the signal bits appearing on the series combinations $T_{n0}$ to $T_{n7}$ of the n-channel field-effect transistors or the signal bits appearing on the series combinations $T_{p0}$ to $T_{p7}$ of the p-channel field-effect transistors are supplied to the output terminals 52 to 66, respectively, of the section 72 through the second transmission gates and associated inverters of the section 72. Thus, the signal bits appearing on the series combinations $$T_{n0}, T_{n1}, T_{n2}, \ldots T_{n7} \qquad (a)$$

or the series combinations $$T_{p7}, T_{p6}, T_{p5}, \ldots T_{p0} \qquad (a')$$

provide the output bits $S_0$ to $S_7$, respectively.

In the presence, on the other hand, of the shift-direction control bit $m_3$ of logic "1" state, the second transmission gates of all the subsections of the section 72 are activated with the first transmission gates of the section 72 held inoperative. Either the signal bits appearing on the series combinations $T_{n7}, T_{n0} \ldots T_{n6}$ of the n-channel field-effect transistors or the signal bits appearing on the series combinations $T_{p0}, T_{p7} \ldots T_{p1}$ of the p-channel field-effect transistors are thus supplied to the output terminals 52, 54 $\ldots$ 66, respectively, of the section 72 through the first transmission gates and associated inverters of the section 72. Thus, the signal bits appearing on the series combinations $$T_{n7}, T_{n0}, T_{n1}, \ldots T_{n6} \qquad (b)$$

or the series combinations $$T_{p0}, T_{p7}, T_{p6}, \ldots T_{p1} \qquad (b')$$

provide the output bits $S_0$ to $S_7$, respectively. Comparison between the sequences (a) and (a') or the sequences (b) and (b') will show that there is achieved a left single-bit shift by the series combinations $T_{n0}$ to $T_{n7}$ of the n-channel field-effect transistors or a right single-bit shift by the series combinations $T_{p0}$ to $T_{p7}$ of the p-channel field-effect transistors as a result of the shift of the bit $m_3$ from logic "0" to logic "1". This means that a rotating shift from $N_i$ to $N_{i-1}$ is achieved when the series combinations $T_{n0}$ to $T_{n7}$ of the n-channel field-effect transistors are selected by the shift-direction control bit $m_3$ and that a rotating shift from $N_i$ to $N_{i+1}$ is achieved when the series combinations $T_{p0}$ to $T_{p7}$ of the n-channel field-effect transistors are selected by the shift-direction control bit $m_3$.

As will have been understood from the foregoing description, the shift-count control section 68 of the control circuit embodying the present invention selectively provides an output bit string expressed by $$S_v = \sum_{i=0}^{2} m_i \cdot 2^i \qquad \text{Eq. 5}$$

when the shift-direction control bit $m_3$ assumes a logic "0" state, or a complementary output bit string expressed by $$S_v = \sum_{i=0}^{2} \overline{m}_i \cdot 2^i \qquad \text{Eq. 6}$$

when the shift-direction control bit $m_3$ assumes a logic "0" state. It will be apparent that Eq. 5 represents a bit string to be passed transparently through the first transmission gates of the shift-count control section 68 in the presence of the shift-direction control bit $m_3$ of a logic "0" state, while Eq. 6 represents a bit string to be passed through the second transmission gates and associated inverters of the section 68 in the presence of the shift-direction control bit $m_3$ of a logic "1" state. Either of these bit strings is processed by the decoder circuit 72 depending upon the logic state of the shift-direction control bit $m_3$ so that, when the bit string represented by Eq. 6 is passed to the decoder circuit 72, the single-bit shifter circuit 70 makes a rotating right shift by a single bit position. This shifting function can be written as $$\begin{aligned} S_v &= \overline{S}_v + 1 \\ &= 2^3 - 2^3 + S_v + 1 \\ &= 2^3 - |S_v| \end{aligned} \qquad \text{Eq. 7}$$

Thus, a left single-bit shift is equivalent to a right seven-bit shift and, likewise, a left two-bit shift is equivalent to a right six-bit shift. This means that a bidirectional right-shift or left-shift operation can be effected in a single, unidirectional shifter circuit as in performing, for example, the scaling of dyadic operands in floating-point arithmetic routines.

Figure 4:
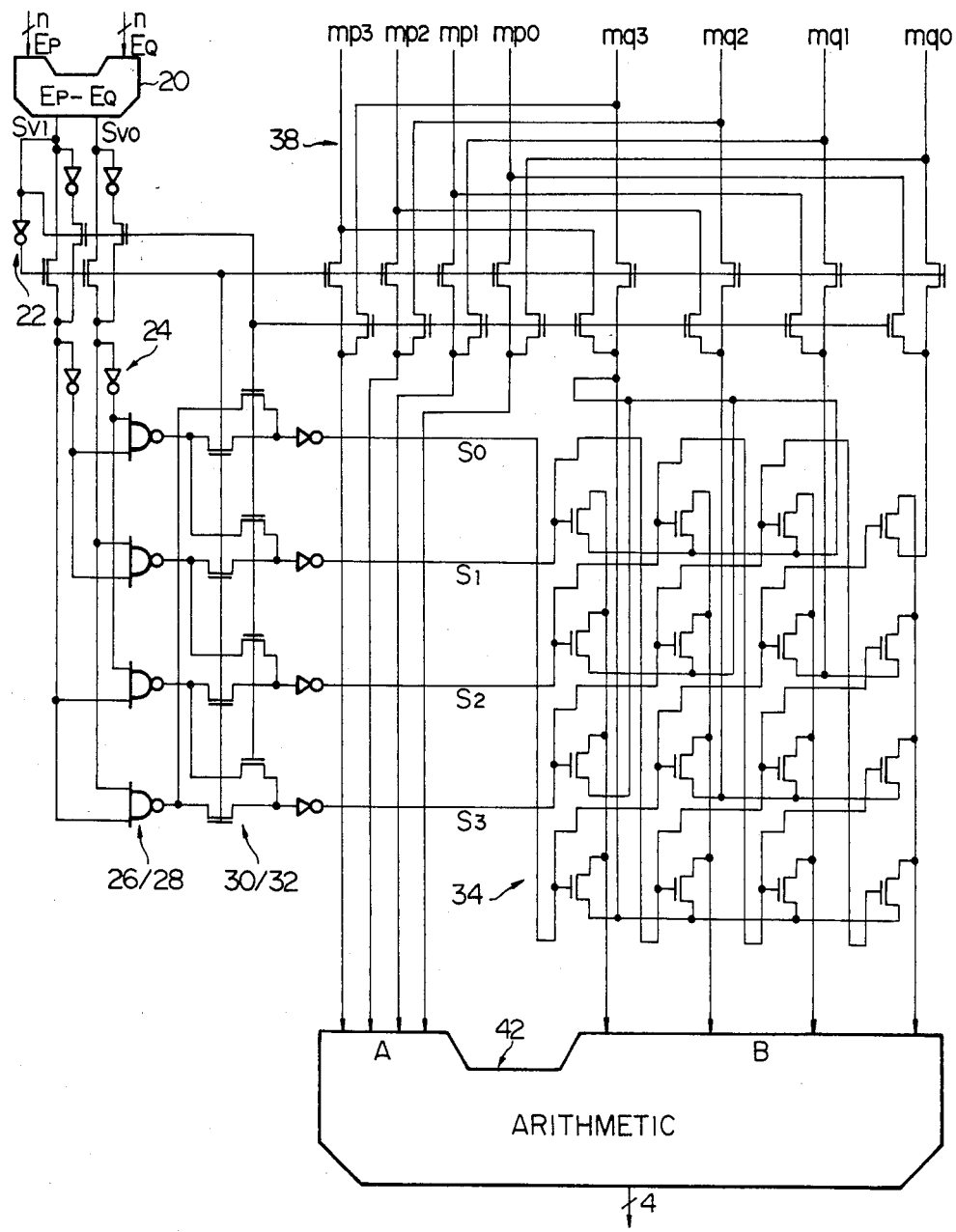
FIG. 4 is a circuit diagram showing still another preferred embodiment of a shift control circuit according to the present invention.

FIG. 4 shows still another preferred embodiment of a shift control circuit according to the present invention. The shift control circuit herein shown is a modification of the shift control circuit incorporated in the floating-point arithmetic system described with reference to FIG. 2 and those circuit sections which are essentially similar to those of the arithmetic system shown in FIG. 2 are denoted by like reference numerals.

In the shift control circuit herein shown, it is also assumed by way of example that a floating-point arithmetic routine is executed for two dyadic mperands. These operands are assumed to consist of a first number word P with a two-bit exponent part $E_P$ and a four-bit mantissa part $M_P$ and a second number word Q with a two-bit exponent part $M_P$ and a four-bit mantissa part $M_Q$. Signals are thus produced which are representative of the respective 2-bit exponent parts $E_P$ and $E_Q$ of these two number words P and Q. These signals are input to an arithmetic subtracter circuit 20 which subtracts the exponent part $E_Q$ of the second number word Q from the exponent part $E_P$ of the first number word P as shown. The subtracter circuit 20 thus outputs signals $S_{v1}$ and $S_{v2}$ indicative of the result of the arithmetic operation. If the result of the subtraction $(E_P - E_q)$ is given in the positive, the subtracter 20 outputs a logic "0" signal $S_{v1}$ and a logic "1" signal $S_{v2}$. If the result of the subtraction $(E_P - E_q)$ is given in the negative, then the subtracter circuit 20 outputs a logic "1" signal $S_{v1}$ and a logic "0" signal $S_{v2}$. One logic "0" or "1" output signal $S_{v1}$ from the subtracter circuit 20 is input to and monitored by a logic circuit 22 which consists of one output terminal of the subtracter circuit 20 and an inverter connected to the particular output terminal of the circuit 20. Thus, the logic circuit 22 outputs inverted and non-inverted versions of the signal $S_{v1}$ from the subtracter circuit 20 determines whether the result of a reversed subtraction $E_Q - E_P$ is in demand or not. The output signal $S_{v1}$ from the subtracter circuit 20 is further supplied to a first transmission gate consisting of a parallel combination of n-channel field-effect transistors. The output signal $S_{v2}$ from the subtracter circuit 20 is supplied to a second transmission gate consisting of a parallel combination of n-channel field-effect transistors and an inverter connected to one of these two transistors as shown. In each of these transmission gates, the transistor directly connected to the subtracter circuit 20 has its gate connected to the output terminal of the inverter forming part of the logic circuit 22 while the transistor connected to the subtracter circuit 20 through the associated inverter has its gate connected to the input terminal of the inverter forming part of the logic circuit 22. The inverters of the transmission gates and the n-channel field-effect transistors serially connected to the inverters implement a one's complement generator circuit 24 which is operative to generate signals representative of the one's complements $\bar{S}_{v1}$ and $\bar{S}_{v2}$ of the supplied signals $S_{v1}$ and $S_{v2}$, respectively.

In the presence of logic "0" and "1" signals $S_{v1}$ and $S_{v2}$ output from the subtracter circuit 20, there are logic "0" and "1" signals at the respective output terminals of the first and second transmission gates. In the presence of logic "1" and "0" signals $S_{v1}$ and $S_{v2}$ output from the subtracter circuit 20, there are also logic "0" and "1" signals at the respective output terminals of the first and second transmission gates. Thus, there are logic "0" and "1" signals appearing at the respective output terminals of the first and second transmission gates without respect to the logic states of the signals $S_{v1}$ and $S_{v2}$ output from the subtracter circuit 20. These logic "0" and "1" signals appearing at the output terminals of the first and second transmission gates are sent on one hand directly to a parallel combination of two-input NAND gates and on the other hand via inverters to the NAND gates. The inverters and NAND gates thus provided subsequently to the transmission gates implement the combination of a first multiplexer 26 and a decoder circuit 28, which is connected to a single-bit shift circuit 30 for being shifted by one bit position in the incremental direction.

The single-bit shift circuit 30 comprises a parallel combination of four transistor networks each consisting of a parallel combination of a first n-channel field-effect transistor having its gate connected to the output terminal of the inverter forming part of the logic circuit 22 and a second n-channel field-effect transistor having its gate connected to the input terminal of the inverter forming part of the logic circuit 22. Thus, the first n-channel field-effect transistor is to be activated in the presence of the logic "0" output signal $S_{v1}$ from the subtracter circuit 20 and the second n-channel field-effect transistor is to be activated in the presence of the logic "1" output signal $S_{v1}$ from the subtracter circuit 20. Each of the NAND gates forming the decoder circuit 28 has its output terminal connected not only to the first n-channel field-effect transistor of the associated transistor network but also to the second n-channel field-effect transistor of the subsequent transistor network to make a single-bit shift in response to the logic "1" signal $S_{v1}$ from the subtracter circuit 20. The transistor networks thus implementing the single-bit shift circuit 30 are connected to control terminals $S_0$, $S_1$, $S_2$ and $S_3$, respectively, of a right shifter circuit 34 through respectively associated inverters which may implement a second multiplexer 32.

The shift control circuit shown in FIG. 4 further comprises third and fourth multiplexers 38 and 40 which are all directly responsive to the signals representative of the respective four-bit exponent parts $E_P$ and $E_Q$ of these two number words P and Q. Signals each of a four-bit length are thus also produced which are representative of the respective mantissa parts $M_P$ and $M_Q$ of the number words P and Q. In the arrangement shown in FIG. 4, these four-bit signals are assumed to consist of a signal consisting of bits $mp_0$, $mp_1$, $mp_2$ and $mp_3$ representative of the mantissa part $M_P$ of the first number word P and a signal consisting of bits $mq_0$, $mq_1$, $mq_2$ and $mq_3$ representative of the mantissa part $M_Q$ of the second number word Q.

Thus, each of the third and fourth multiplexers 38 and 40 has four input terminals respectively responsive to the signal bits $mp_0$, $mp_1$, $mp_2$ and $mp_3$ representative of the mantissa part $M_P$ of the number word P and the signal bits $mq_0$, $mq_1$, $mq_2$ and $mq_3$ representative of the mantissa part $M_Q$ of the number word Q. Furthermore, the third multiplexer 38 is composed of a parallel combination of four, first to fourth transistor networks associated with the input terminals to receive the signal bits $mp_0$, $mp_1$, $mp_2$ and $mp_3$, respectively. Likewise, the fourth multiplexer 40 is composed of a parallel combination of four, first to fourth transistor networks associated with the input terminals to receive the signal bits $mq_0$, $mq_1$, $mq_2$ and $mq_3$, respectively. The transistor networks forming the third multiplexer 38 have respective output terminals directly connected to a dyadic arithmetic circuit 42 while the transistor networks forming the fourth multiplexer 40 have respective output terminals connected to the dyadic arithmetic circuit 42 through the right shifter circuit 34. Each transistor network of the third and fourth multiplexers 38 and 40 consists of a parallel combination of two, first and second n-channel field-effect transistors. Of the two transistors forming each transistor network of the third multiplexer 38, the first n-channel field-effect transistor has its gate connected to the output terminal of the inverter forming part of the logic circuit 22 and the second n-channel field-effect transistor has its gate connected to the input terminal of the inverter forming part of the logic circuit 22. In the fourth multiplexer 40, the first n-channel field-effect transistor has its gate connected to the input terminal of the inverter forming part of the logic circuit 22 and the second n-channel field-effect transistor has its gate connected to the output terminal of the inverter forming part of the logic circuit 22. Thus, in the third multiplexer 38, the first n-channel field-effect transistors of the transistor networks are to be activated in the presence of the logic "0" output signal $S_{v1}$ from the subtracter circuit 20 and the second n-channel field-effect transistors of the transistor networks are to be activated in the presence of the logic "1" output signal $S_{v1}$ from the subtracter circuit 20. In the fourth multiplexer 40, the second n-channel field-effect transistors of the transistor networks are to be activated in the presence of the logic "0" output signal $S_{v1}$ from the subtracter circuit 20 and the first n-channel field-effect transistors of the transistor networks are to be activated in the presence of the logic "1" output signal $S_{v1}$ from the subtracter circuit 20.

The input terminal to receive the signal bit $mp_0$ is connected through the first n-channel field-effect transistor of the first transistor network of the multiplexer 38 to the dyadic arithmetic circuit 42 and through the first n-channel field-effect transistor of the first transistor network of the multiplexer 40 to the dyadic arithmetic circuit 42 by way of the right shifter circuit 34. The input terminal to receive the signal bit $mp_1$ is connected through the first n-channel field-effect transistor of the second transistor network of the multiplexer 38 to the dyadic arithmetic circuit 42 and through the first n-channel field-effect transistor of the second transistor network of the multiplexer 40 to the dyadic arithmetic circuit 42 by way of the right shifter circuit 34. The input terminal to receive the signal bit $mp_2$ is connected through the first n-channel field-effect transistor of the third transistor network of the multiplexer 38 to the dyadic arithmetic circuit 42 and through the first n-channel field-effect transistor of the third transistor network of the multiplexer 40 to the dyadic arithmetic circuit 42 by way of the right shifter circuit 34. The input terminal to receive the signal bit $mp_3$ is connected through the first n-channel field-effect transistor of the fourth transistor network of the multiplexer 38 to the dyadic arithmetic circuit 42 and through the first n-channel field-effect transistor of the fourth transistor network of the multiplexer 40 to the dyadic arithmetic circuit 42 by way of the right shifter circuit 34.

The input terminal to receive the signal bit $mq_0$ is connected through the second n-channel field-effect transistor of the first transistor network of the multiplexer 38 to the dyadic arithmetic circuit 42 and through the second n-channel field-effect transistor of the first transistor network of the multiplexer 40 to the dyadic arithmetic circuit 42 by way of the right shifter circuit 34. The input terminal to receive the signal bit $mq_1$ is connected through the second n-channel field-effect transistor of the second transistor network of the multiplexer 38 to the dyadic arithmetic circuit 42 and through the second n-channel field-effect transistor of the second transistor network of the multiplexer 40 to the dyadic arithmetic circuit 42 by way of the right shifter circuit 34. The input terminal to receive the signal bit $mq_2$ is connected through the second n-channel field-effect transistor of the third transistor network of the multiplexer 38 to the dyadic arithmetic circuit 42 and through the second n-channel field-effect transistor of the third transistor network of the multiplexer 40 to the dyadic arithmetic circuit 42 by way of the right shifter circuit 34. The input terminal to receive the signal bit $mq_3$ is connected through the second n-channel field-effect transistor of the fourth transistor network of the multiplexer 38 to the dyadic arithmetic circuit 42 and through the second n-channel field-effect transistor of the fourth transistor network of the multiplexer 40 to the dyadic arithmetic circuit 42 by way of the right shifter circuit 34.

Thus, in the presence of the logic "0" signal $S_{v1}$ output from the subtracter circuit 20, the signal bits $mp_0$, $mp_1$, $mp_2$ and $mp_3$ at the input terminals of the third multiplexer 38 are passed as they are to the dyadic arithmetic circuit 42. Under this condition, the signal bits $mq_0$, $mq_1$, $mq_2$ and $mq_3$ at the input terminals of the fourth multiplexer 40 are supplied to the right shifter circuit 34 and are shifted right by a number dictated by the signal bits appearing at the control terminals $S_0$, $S_1$, $S_2$ and $S_3$, respectively, of the right shifter circuit 34. On the other hand, in the presence of the logic "1" signal $S_{v1}$ output from the subtracter circuit 20, the signal bits $mq_0$, $mq_1$, $mq_2$ and $mq_3$ at the input terminals of the fourth multiplexer 40 are passed as they are to the dyadic arithmetic circuit 42. Under this condition, the signal bits $mp_0$, $mp_1$, $mp_2$ and $mp_3$ at the input terminals of the fourth multiplexer 40 are supplied to the right shifter circuit 34 and are shifted right by a number dictated by the signal bits appearing at the control terminals $S_0$, $S_1$, $S_2$ and $S_3$, respectively, of the right shifter circuit 34.

What is claimed is:

1. A shift control circuit comprising:
   (a) bit string generator means for producing a string of a predetermined number of data bits,
   (b) switching means for detecting the positive or negative sign of the bit string and producing a first switch signal responsive to the positive sign of the bit string or a second switch signal responsive to the negative sign of the bit string;
   (c) one's complement generator means for producing a signal representative of the one's complement of said bit string,
   (d) first selective signal transfer means responsive to said first and second switch signals for allowing said bit string to pass therethrough in response to the first switch signal or to the signal from said one's complement generator means in response to the second switch signal,
   (e) decoder means for decoding the bit string or the signal passed through said first selective signal transfer means for producing a decoded output signal,
   (f) single-bit shifting means for shifting the bit of the decoded output signal by a single-bit in a predetermined direction for producing a single-bit shifted output signal, and
   (g) second selective signal transfer means responsive to said first and second switch signals for allowing said decoded output signal to pass therethrough in response to said first switch signal or to the signal from said single-bit shifting means in response to said second switch signal.

2. A shift control circuit comprising:

(a) bit string generator means for producing a string of a predetermined number of data bits, (b) switching means for detecting the positive or negative sign of the bit string and producing a first switch signal or a second switch signal responsive to the negative sign of the bit string, (c) first selective signal transfer means responsive to said first and second switch signals for allowing said bit string to pass therethrough in response to the first switch signal in response to the second switch signal, (d) one's complement generator means responsive to said first and second switch signals for producing a signal representative of the one's complement of said bit string in response to said second switch signal, (e) decoder means for decoding the bit string or the signal passed through said first selective signal transfer means for producing a decoded output signal, (f) single-bit shifting means for shifting the bit of the decoded output signal by a single bit in a predetermined direction for producing a single-bit shifted output signal, and (g) second selective signal transfer means responsive to said first and second switch signals for allowing said decoded output signal to pass therethrough in response to said first switch signal or to the signal from said single-bit shifting means in response to said second switch signal.

3. A shift control circuit as set forth in claim 2, in which (h) said first selective transfer means comprises a plurality of first signal transmission gate means respectively responsive to the individual bits of the bit string produced by said bit string generator means, each of said first signal transmission gate means having a control terminal responsive to said first and second switch signals from said switch means and being activated to pass said bit string therethrough in response to the first switch signal, and (i) said ones complement generator means comprises a plurality of second signal transmission gate means respectively responsive to the individual bits of bit string produced by said bit string generator means, and a plurality of inverter means respectively connected to said second signal transmission gate means respectively operative to invert the individual bits of said bit string, each of said second signal transmission gate means having a control terminal responsive to said first and second switch signals from said switch means and being activated to pass therethrough the bits inverted by said inverters in response to said second switch signal.

4. A shift control circuit of a floating-point arithmetic system wherein a floating-point arithmetic routine is executed for two dyadic operands which consist of first and second number words each having an exponent part and a mantissa part, the shift control circuit comprising:

(a) signal generating means for generating signals representative of the respective exponent parts and respective mantissa parts and of said first and second number words;

(b) a first subtracter circuit responsive to the signals representative of the respective exponent parts and of said first and second number words and for subtracting the exponent part of said second number word from the exponent part of said first number word and producing a signal including a string of data bits indicative of the result of the arithmetic subtraction;

(c) a logic circuit responsive to the signal from said first subtracter circuit for determining whether the result of said arithmetic subtraction has a negative sign with the exponent part larger than the exponent part and producing a signal of a predetermined logic state when it is determined that the result of the arithmetic subtraction has a negative sign:

(d) a one's complement generator circuit responsive to the signal from said first subtracter circuit for generating a signal representative of the one's complement of said result of arithmetic subtraction;

(e) a first multiplexer responsive to the signals from said subtractor circuit and said one's complement generator circuit and to the signal from said logic circuit, the first multiplexer having a first state allowing the signal from the one's complement generator circuit to pass therethrough and a second state allowing the signal from the subtractor circuit to pass therethrough, the first multiplexer having said first state in the absence of the signal of said predetermined logic state from said logic circuit and having said second state in the presence of the signal of said predetermined logic state from said logic circuit;

(f) a decoder circuit for decoding the signal passed through said first multiplexer for producing a decoded output signal;

(g) a single-bit shift circuit for shifting the bits of the decoded output signal by a single bit in a predetermined direction for producing a single-bit shifted output signal, (h) a second multiplexer responsive to the signals from said decoder circuit and said single-bit shift circuit and to the signal from said logic circuit, the second multiplexer having a first state allowing the signal from the decoder circuit to pass therethrough and a second state allowing the signal from the single-bit shift circuit to pass therethrough, the second multiplexer having said first state thereof in the absence of the signal of said predetermined logic state from said logic circuit and said second state thereof in the presence of the signal of said predetermined logic state from said logic circuit;

(i) a third multiplexer responsive to the signal indicative of the exponent part of said first number word and the signal indicative of the exponent part of said second number word, and to the signal from said logic circuit, the third multiplexer having a first state allowing the signal indicative of the exponent part of said first number word to pass therethrough and a second state allowing the signal indicative of the exponent part of said second number word to pass therethrough, the third multiplexer having said first state thereof in the absence of the signal of the predetermined logic state from said logic circuit and said second state thereof in the presence of the signal of the predetermined logic state form said logic circuit, the signal indicative of the exponent part of said first number word being passed through the third multiplexer and output as representative of the exponent part of an output number word when the third multiplexer has said first state thereof and the signal indicative of the exponent part of the second number word being passed through the third multiplexer and is output as representative of the exponent part of said output number word when the third multiplexer has said second state thereof;

(j) a fourth multiplexer responsive to the signal indicative of the mantissa part of said first number word and the signal indicative of the mantissa part of said second number word, and to the signal from said logic circuit, the fourth multiplexer having a first state allowing the signal indicative of the mantissa part of said first number word to pass therethrough and a second state allowing the signal indicative of the mantissa part of said second number word to pass therethrough, the fourth multiplexer having said first state thereof in the absence of the signal of the predetermined logic state from said logic circuit and said second state thereof in the presence of the signal of the predetermined logic state form said logic circuit;

(k) a fifth multiplexer responsive to the signal indicative of the mantissa part of said first number word and the signal indicative of the mantissa part of said second number word, and to the signal from said logic circuit, the fifth multiplexer having a first state allowing the signal indicative of the mantissa part of said second number word to pass therethrough and a second state allowing the signal indicative of the mantissa part of said first number word to pass therethrough, the fifth multiplexer having said first state thereof in the absence of the signal of the predetermined logic state from said logic circuit and said second state thereof in the presence of the signal of the predetermined logic state from said logic circuit;

(l) a right circuit responsive to the signals respectively passesd through said second and fifth multiplexers, and operative to make a rightward shift of the digits of the signal from the fourth multiplexer with a bit count represented by the signal from the second multiplexer for producing a signal representative of a right-shifted version of the mantissa part of said second number word; and (m) a dyadic arithmetic circuit having one input terminal responsive to the signal passed through said fourth multiplexer and another input terminal responsive to the signal output from arithmetic addition or subtraction between the input signal representative of the mantissa part of said first number word and the signal representative of the right-shifted version of the original mantissa part of said second number word, the signal resulting from said arithmetic addition or subtraction being output from the arithmetic circuit as being representative of the mantissa part of said output number word.

* * * * *

UNITED STATES PATENT AND TRADEMARK OFFICE
CERTIFICATE OF CORRECTION

PATENT NO. : 4,807,172

DATED : February 21, 1989

INVENTOR(S) : TOMOJI NUKYAMA

It is certified that error appears in the above-identified patent and that said Letters Patent is hereby corrected as shown below:

Col. 4, line 44, delete "i" and insert --is--.

Col. 5, line 50, after "previously," insert --this prior-art approach has the problems including the--.

Col. 6, line 22, delete "$S_V$" and insert --$\bar{S}_V$--.

line 28, delete "$S_V$" and insert --$\bar{S}_V$--.

line 39, delete "$S_V + 1$" and insert --$\bar{S}_V + 1$--.

line 46, delete "$S_V$" and insert --$\bar{S}_V$--.

line 57, delete "$S_V$" and insert --$\bar{S}_V$--.

Col. 10, line 24, delete "ml" and insert --$m_1$--.

Col. 12, line 35, delete "00" and insert --100--.

UNITED STATES PATENT AND TRADEMARK OFFICE
CERTIFICATE OF CORRECTION

PATENT NO. : 4,807,172

DATED : February 21, 1989

INVENTOR(S) : TOMOJI NUKYAMA

It is certified that error appears in the above-identified patent and that said Letters Patent is hereby corrected as shown below:

Col. 14, line 32, delete "$S_v$" and insert --$\overline{S}_v$--.

Col. 15, line 5, delete "mperands" and insert --operands--.

Signed and Sealed this

Thirty-first Day of October, 1989

*Attest:*

DONALD J. QUIGG

*Attesting Officer*

*Commissioner of Patents and Trademarks*